United States Patent
Salenbien, Jr. et al.

[15] 3,686,653
[45] Aug. 22, 1972

[54] PRODUCTION MONITORING SYSTEM FOR PLURALITY OF WORK STATIONS

[72] Inventors: Albert L. Salenbien, Jr., Adrian; William D. Wood, Waters, both of Mich.

[73] Assignee: Worldtronic, Inc., Clare, Mich.

[22] Filed: Nov. 12, 1969

[21] Appl. No.: 875,742

[52] U.S. Cl. .......................... 340/213 Q, 340/163 R
[51] Int. Cl. .......................... G08b 19/00, H04q 3/00
[58] Field of Search .......................... 340/213 Q, 163

[56] References Cited

UNITED STATES PATENTS

| | | | |
|---|---|---|---|
| 2,489,213 | 11/1949 | Addorisio | 340/286 |
| 2,985,871 | 5/1961 | Bemis | 340/286 |
| 3,230,520 | 1/1966 | Lurie | 340/286 |
| 3,307,176 | 2/1967 | Sadler | 340/416 X |
| 3,310,797 | 3/1967 | Auger | 340/286 |
| 3,426,348 | 2/1969 | Sadler | 340/416 X |
| 2,985,368 | 5/1961 | Kohler | 340/163 X |
| 3,305,850 | 2/1967 | Suozzo | 340/163 X |
| 3,480,938 | 11/1969 | Martin | 340/213.1 |
| 3,522,588 | 8/1970 | Clarke | 340/163 X |
| 3,529,293 | 9/1970 | Sullivan | 340/163 |

*Primary Examiner*—Harold I. Pitts
*Attorney*—Wilson & Fraser

[57] ABSTRACT

A production monitoring system having sensing means and operator controlled means at a work station for indicating production conditions to a central station. Visual indications at the central station of conditions for a plurality of work stations are by status indicators individual to the work stations or grouped stations. Operator controlled signals alter the status indicators to alert a central station attendant. Attendant acknowledgment of a signal causes it to be displayed on a panel common to a number of stations. Status and signals are applied to an output to a computer which is isolated from the plant and other monitoring system elements. In a system employing solid state active elements isolation is by means of transformers having shielded secondaries and employing plant ground for circuits on the primary side and a separate computer ground for circuits on the secondary side. Binary coding and decoding is employed to reduce in plant wiring.

12 Claims, 6 Drawing Figures

Patented Aug. 22, 1972  3,686,653
4 Sheets-Sheet 1
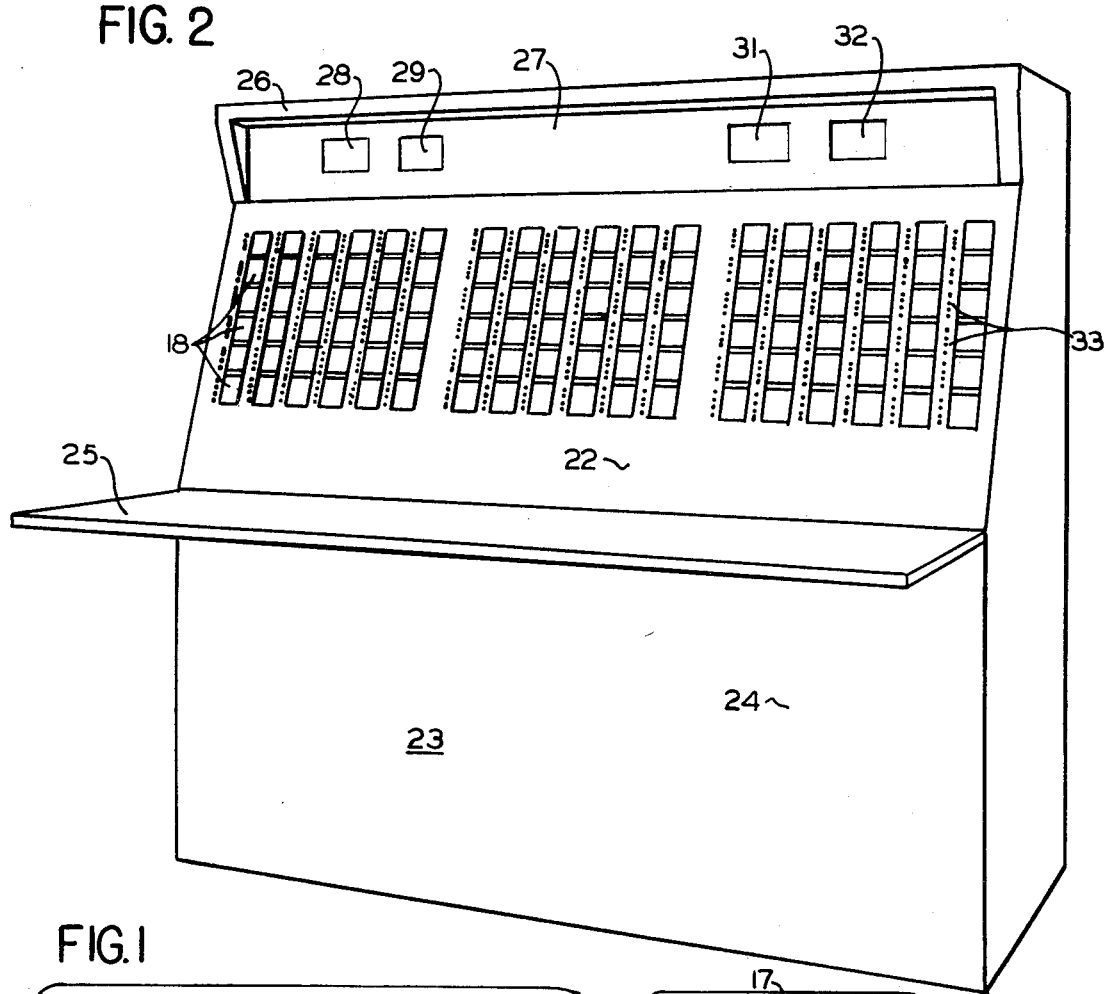
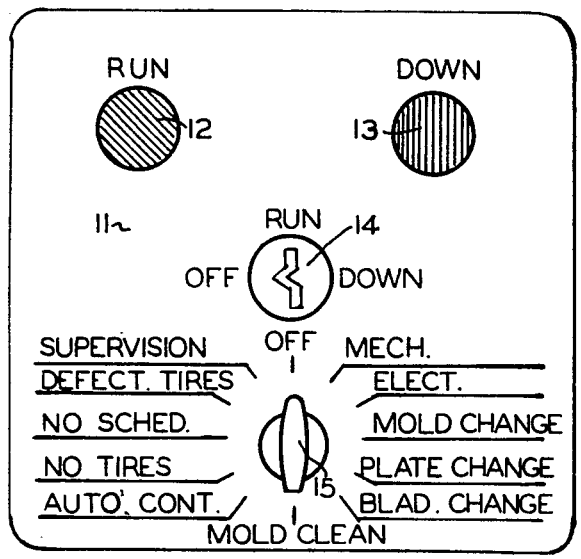
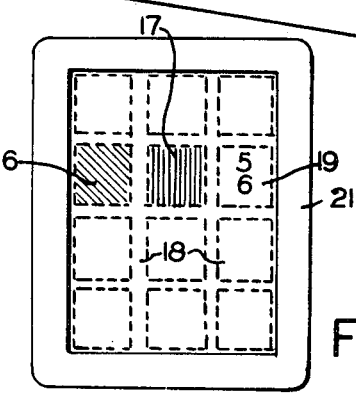
INVENTORS
WILLIAM D. WOOD
ALBERT L. SALENBIEN JR
BY
Wilson & Fraser INVENTORS
WILLIAM D. WOOD
ALBERT L. SALENBIEN JR.
BY
Wilson & Fraser INVENTORS
WILLIAM D. WOOD
ALBERT L. SALENBIEN JR.
BY
Wilson & Fraser.

PRODUCTION MONITORING SYSTEM FOR PLURALITY OF WORK STATIONS

BACKGROUND OF THE INVENTION

Heretofore it has been known to integrate a plurality of work stations with a central station and a computer interface for production monitoring and scheduling purposes. In U.S. Pat. application Ser. No. 696,462 filed Jan. 8, 1968, in the name of Charles G. Mann for "Production Monitoring System" electromechanical relay switching elements were employed to establish signal circuits at the central station and to a computer interface. The limitations of such circuits including their power consumption, size, and slow operating characteristics are known. Alteration of these circuits for solid state switching required more than the mere substitution of transistors, and controlled rectifiers for relays and their contacts since it was found that spurious signals were presented to the computer to produce false indications where such substitutions were attempted and the polarization of signals could not readily be utilized for control.

In the relay type of system, signal isolation between the plant and production monitoring system circuits and the computer input was accomplished by the separation afforded by employing relay contacts in circuits isolated from their actuating coil circuits. Such isolation is not available in conventional solid state switching circuits.

The prior systems employed status and signal displays individual to the monitored equipment. Thus the number of work stations or groups monitored by the central station was restricted by space limitations.

SUMMARY OF THE INVENTION

This invention relates to production monitoring systems and more particularly to such systems wherein work station status, production count, sensed production information, and operator call signals are transmitted to a central station to be applied to an indicating means such as a panel display and to a computer which is programmed for production control.

The invention features binary coding and decoding to reduce the wiring between the several work stations and the central station.

Another feature is the use of solid state active elements to decode and switch status, production and call signals between display means and outputs for a computer while isolating the plant and production monitoring circuits and signals from the computer.

The production monitoring system has interfaces to equipment which is sufficiently sensitive to respond adversely to the spurious signals developed in manufacturing plants. More particularly, the system affords isolation by employing floating power supplies and a ground which is isolated from the plant ground and the work station, and central station circuits employing the plant ground. Signals are coupled to the interface circuits by transformers and are polarized for utilization by the interface circuit by those transformers. High voltage spurious signals such as spike pulses induced from welders are isolated from the display means and computer at the interface circuits by employing back biased diodes for clipping and r-c filters to ground ahead of the coupling transformer primaries.

Other features involve a common display of call signals selectively actuable for individual monitored work stations, or groups of stations. Individual status indicators are provided for each work station or group of stations with means to selectively actuate the common display means for a station. The central station attendant is alerted to actuate the display when the status indicators are conditioned to indicate a message has been transmitted from that station.

DESCRIPTION OF THE DRAWINGS

FIG. 1 is a front view of a control box for a work station according to this invention;

FIG. 2 is a perspective of a central station console for visually monitoring four hundred and thirty-two work stations according to this invention;

FIG. 3 is a front view of a four station status and machine identification display as employed on the console of FIG. 2;

FIG. 6 is positioned in horizontal alignment with FIG. 4 with its arrow-headed input leads matched with the arrow-headed output leads extending to the right near the center of FIG. 4.

DESCRIPTION OF THE PREFERRED EMBODIMENT

Figure 4:
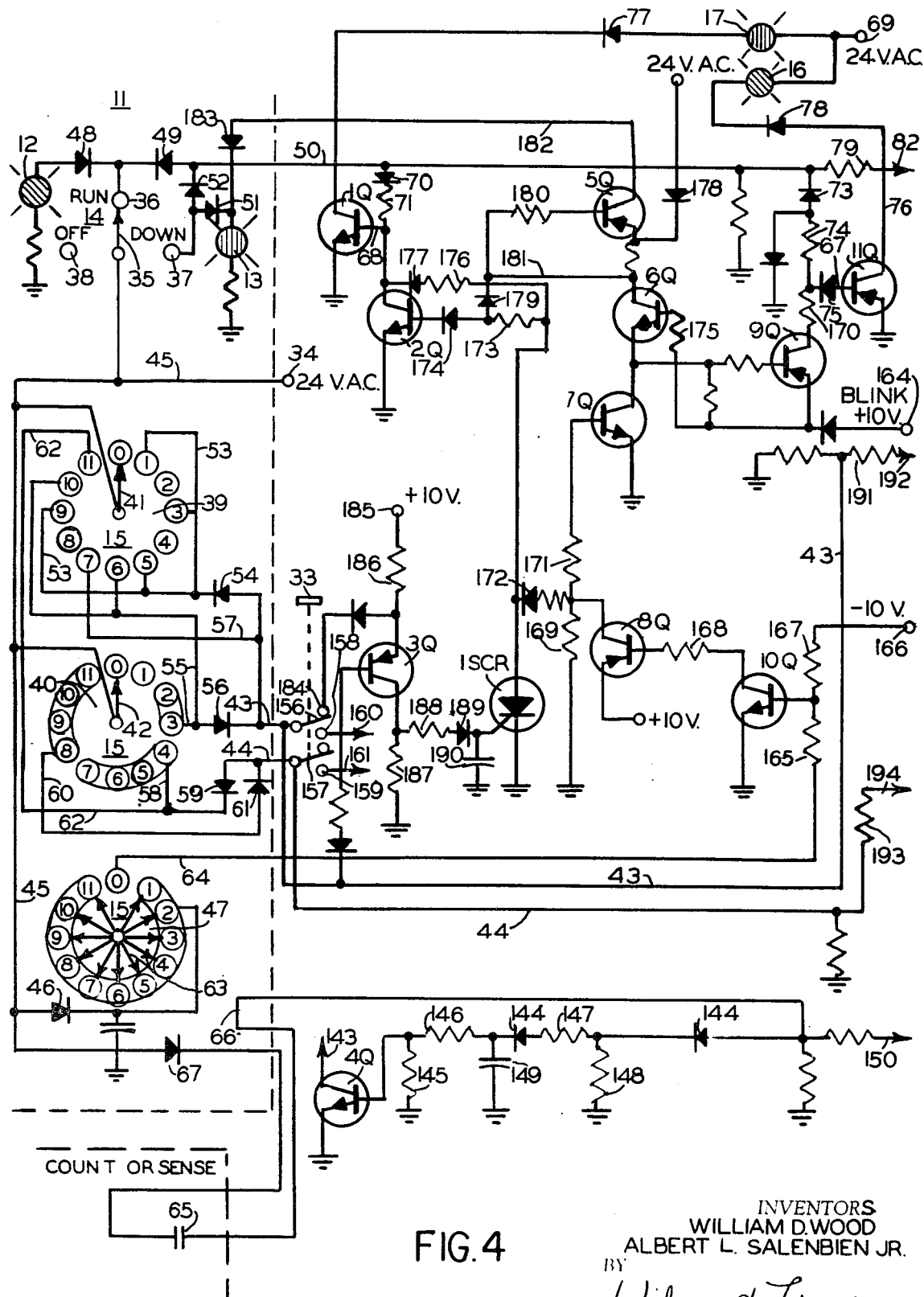
FIG. 4 is a schematic diagram of the electrical circuits for a work station control box, work sensing means and central station logic control for a work station as employed with FIGS. 1 and 2.

The work stations of a plant are subject to a number of conditions which are significant in the control of over-all plant operations. In the exemplary system presented below, three catagories of information will be considered, status information, production count, and sensed production information. Status information includes the assigned status of the work station or machine as "run", "down" or "off"; and the status indicated by personnel at the station by means of a signal transistor. In the illustration, eleven messages can be sent selectively from the signal transmitter of a work station. Usually these messages indicate classifications of problems or needs encountered including "mechanical", "electrical", "machine set up", "machine part failure", "absence of raw materials", "faulty production", "supervisor" and the like. Count information is derived from a limit switch, photo cell or the like responsive to an operation typical of the completion of a function to be counted at the work station such as the removal of a processed part from the station. Sensing information conventionally is process parameters such as temperature, pressure, sequence and timing conditions.

A control box 11 is located at each work station to provide the operator with an indication of the assigned status of the station by means of "run" and "down" lamps 12 and 13 respectively. Status can be assigned from the floor of the plant by authorized personnel through key operation of switch 14 which has three positions "off", "run" and "down". The work station operator has access to a call switch 15 having a number of positions representing conditions or requests which are indicated to the central station attendant and recorded by the computer. These calls are selected by the positioning of switch 15 and result in the establishing of a binary code signal at the control box and a decoding of that signal at the central station console and computer.

The status indicator lamps 12 and 13 are duplicated for each work station or monitored group "run" and "down" by lamps 16 and 17, FIG. 3, displayed on an indicator window 18 which may be a ground glass screen. Each window 18 displays "run" and "down" indicators for four stations in horizontally aligned sets. A projection system is also provided to display an identification of the machine on window sections 19 horizontally aligned with the status lamps of the machine. In the illustration of the system applied to a tire manufacturing plant a display for molds "5" and "6" is represented at 19. Window 18 is embraced in a frame 21 for mounting on console panel 22 in an array as shown in FIG. 2.

Console 23 of FIG. 2 includes a cabinet 24 having a display panel 22 and a work shelf 25 beneath the panel. Above panel 22 is a shroud 26 enclosing a panel 27 having message display screens 28, 29, 31 and 32. Reset-read buttons 33 are located on panel 22 adjacent each set of work station status indicators and are individual to the work station of the indicators to actuate display mechanisms (not shown) whereby a call message set on call switch 15 of the work station is displayed on one of the message display screens.

In practice, the computer monitors the signals from each work station, usually on a periodic basis as established by a scanning schedule. When a work station is set to run and no message is set or other disruptive condition is sensed, "run" lamps 12 and 16, conveniently green in color, at the work station and central station are continuously illuminated. If it is set down and no message or disruptive condition is present "down" lamps 13 and 17 are continuously illuminated, conveniently red in color. A station in an off status normally has no status lamp illuminated.

The setting of a message at the control box alters the operation of the indicator system to alert both the work station operator and the central station attendant. When a call is set on the run status, the lamps alternatively blink to produce flashing red and green at both stations. On the down status or when off, the red lamp is blinked in response to a call setting.

Acknowledgment of a call by the central station attendant is by depressing the read-reset button 33 for the station indicating a call. While button 33 is maintained depressed the message set at the work station is displayed on one of the screens 28, 29, 31 and 32 and the identifying machine number is indicated in area 19 of the window 18 for the work station. The status indicator lamp status is altered by acknowledgment to maintain an indication that a message is set in the case of a run status by continuing the blink of the green lamp while the red lamp is extinguished. For a down setting, the blinking red is replaced by a continuous red and for the off status all illumination of the lamps is terminated. Reset of the call switch 15 to off returns the control of the indicator lamps to normal. If a new message is set without clearing switch 15 to "off" the message indication is recycled.

The same circuits which supply the visual indicators also supply the outputs to the computer.

FIG. 4 illustrates the work station control box 11 enclosed by dashed lines. The box mounted indicator lamps 12 and 13 are supplied from a suitable source such as a 60 cycle, 24 volt alternating current source connected to terminal 34 through restricted access switch 14. Lamps 12 and 13 are color coded, as green and red, to indicate assigned status for the work station as set on switch 14 to "run" when contact are 35 engages contact 36, "down" when contact arm 35 engages contact 37 and "off" when arm 35 is on contact 38. Decks 39 and 40 of switch 15 are connected in a binary coded array as illustrated so that the 12 positions of contact arms 41 and 42 produce 11 output signals characteristic of binary counts one to 10 and 12 on leads 43 and 44 through the combinations of negative half cycle pulses on 43 as a "one", positive half cycle pulses on 43 as a "two", negative half cycle pulses on 44 as a "four", and positive half cycle pulses on 44 as an "eight".

An alternating current is supplied control box 11 over lead 45 from a suitable source in the plant and is connected to switch arms 35, 41 and 42 and through rectifier 46 to reset deck 47 contacts of switch 15. Negative half cycles on lead 45 energize lamp 12 through rectifier 48 when switch 15 has arm 35 on contact 36 whereby the "run" condition is indicated at the control box while negative half cycle pulses passed by diode 49 to lead 50 from the control box to the operators console 23 at the central station activates a run indicator 16. Setting of arm 35 of switch 14 on contact 37 energizes "down" indicator lamp 13 through rectifier 51 poled to pass positive half Rectifier rectifier 52 passes positive half cycles to lead 50 to activate a corresponding "down" indicator 17 in the console 23 at the central station.

Trouble calls are set by switch 15 which establishes polarized signals in the form of positive and negative pulses on leads 43 and 44 derived from the alternating current source supplying lead 45. When arms 41 and 42 are at position "1", a "1" signal is passed as negative pulses on lead 43 from lead 53 and rectifier 54. Binary combinations of "3", "5" and "9" also utilizing "1" are also connected to lead 53 and rectifier 54. Counts "2" and "3" employ a binary "2" as positive pulses on lead 43 passed from arm 42 to contacts "2" and "3" of deck 40 through lead 55 and rectifier 56. Count "7" employs both binary signals "1" and "2" from deck 39 on lead 57 to lead 43. The binary "4" signal employed for counts "4", "5", "6" and "7" is developed as negative pulses on lead 44 through arm 42, lead 58 and rectifier 59. Positive pulses on lead 44 for binary "8" through "11" are passed from arm 42 to lead 60 through rectifier 61. Position "11" is signified by a binary "12" by providing negative pulses from deck 39 on lead 62 to effectively place full wave a.c. on lead 44.

The message transmitter 15 at the work station control box 11 is arranged to transmit successive trouble messages and indicate the new message without being cycled through its zero position by the interrupt signals from deck 47.

Deck 47 has an array of contact arms 63 corresponding to positions one to eleven with no contact at the zero position. Thus any transfer of switch 15 to a position other than zero completes a circuit passing positive pulses from rectifier 46 to the interconnected contacts one to eleven of deck 47, through contacts 63 to contact zero and lead 64. As will be described more fully, the interruption of the train of positive pulses on lead 64 as the message transmitter switch is transferred between two message positions or is set on its zero position actuates a reset of the circuit controlling the flashing of the indicator lamps.

In addition, to control box 11 at the work station, there is also a count device (not shown) which closes contacts 65 either directly or through an intermediate relay (not shown). The count indicates a cycle significant in the operation of the station such as the completion of a work unit. Sensing devices such as limit switches on the covers for molds which are closed to initiate a work cycle, pressure sensitive switches responsive to imposition of a critical pressure on the article in the mold, temperature sensing switches, cycle timer switches and the like all are typified by switch 65.

In practice, the count is continuously effective upon the central station equipment over lead 66 by transmitting positive pulses derived from lead 45 and passed by rectifier 67 while the count contact 65 is closed. The sense contacts are ordinarily scanned periodically to provide information signals at the computer interface during the moment of scanning.

The control box 11 and, through lead 66 to control box 11, the count device are coupled to the central station controls by cabling which may be through plug and jack connectors (not shown). Lead designations have been retained through the cabling to the console 23 at the central station.

Run lamp 16 in the console is energized through transistor 11Q which is either cut off or operated in saturation by virtue of the signal imposed on its base lead 67. Down lamp 17 in the console is controlled through transistor 1Q by control of its base through lead 68. The grounded emitter configuration is employed with the emitter-collector-lamp circuit connected across a suitable a.c. source such as 24 volts applied at terminal 69. Continuous illumination is by maintaining a train of pulses of a.c. of the proper polarity on lead 50. When positive pulses are present, rectifier 70 and resistor 71 biases the base of N-P-N transistor 1Q, to maintain conduction and pass current on lead 72 from down indicator lamp 17. When negative pulses are passed from switch 14 on lead 50 through rectifier 73, resistor 74 and rectifier 75 to the base of P-N-P transistor 11Q run lamp 16 is illuminated through lead 76. The a.c. power to lamps 16, and 17 is suitably polarized to half wave by rectifiers 77 and 78.

Figure 5:
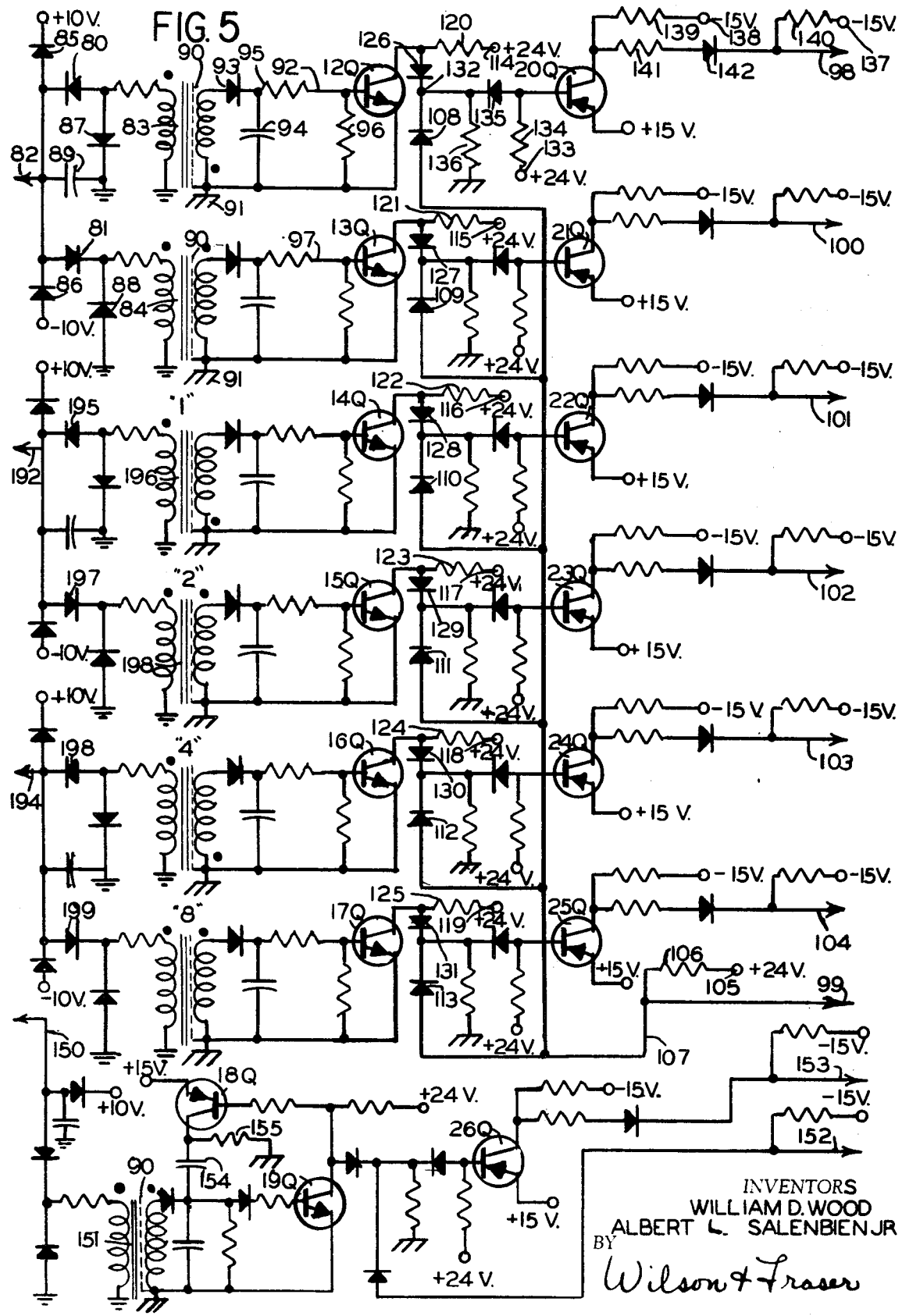
FIG. 5 is a schematic diagram of a continuation of the electrical circuits for a work station at the central station adapted to be placed in horizontal alignment with FIG. 4 providing the output to the computer and showing circuit isolation of the computer from the plant and production monitoring system according to this invention.

The "run" or "down" signal on lead 50 is also passed by resistor 79 to one of rectifiers 80 or 81 of FIG. 5 through arrow-headed leads 82, depending on the polarity of the pulses, and thence to the primaries of transformers 83 or 84 of the computer interface. Rectifiers 85 and 86 are respectively back biased from sources of positive and negative voltage clip all signals to 10 volts at the interface. This clipping in conjunction with the ground through capacitance 89 prevents spiked signals induced in the conductors between the work and central stations from developing signals in the secondaries. The reverse signals in the transformer primaries, as upon decay of a signal, are grounded through reverse poled rectifiers 87 and 88.

Transformers 83 and 84 have their primaries grounded to the ground for the plant and the monitoring equipment. The secondaries and static shields 90 between the primaries and secondaries of these transformers are connected to a separate ground 91 provided for the computer. All transformers at the interface circuits are polarized so that the upper end of the secondary as viewed in the drawing passes positive pulses in response to the effective signal. Thus in the case of a negative going pulse for a "run" signal, the secondary of transformer 83 issues a positive going signal approaching a square pulse on lead 92 by virtue of rectifier 93 and the filtering of the capacitance 94, and resistors 95 and 96. Conversely, a positive pulse on 50 results in a positive pulse shaped on lead 97, by virtue of its rectifying and filtering network in a circuit grounded to the computer and isolated from plant ground by the polarization of the windings.

A positive going signal on the base of N-P-N transistor 12Q places it in conduction and results in a positive going signal at the digital input "run" terminal 98 at selected intervals controlled by the computer. The gating of the signals occurs only when the computer is conditioned to read the input for the work station in question. This gating is by the application of ground by the computer to terminal 99 (the "status" electronic contact operate or ECO terminal). This ground is periodically applied in the scanning surveillance of the plant by the computer, e.g. once every 11 seconds for an interval of at least 2 milliseconds. During the ECO interval, the status at "run" terminal 98, "down" terminal 100 and binary "1 ", "2 ", "4"and "8" terminals 101, 102, 103 and 104 respectively is displayed to the respective computer digital inputs. Such display is the result of reducing the positive bias from terminal 105 supplied from the computer, e.g. +24 volts d.c. to computer ground by the drop in resistor 106 to lead 107. Reduction of the voltage on the lead 107 to of the order of +6 volts in the example lowers the bias from one source to the base of each of the output transistors 20Q through 25Q through respective rectifiers 108 through 113. If at this time the base bias supplied from any of the alternative sources of cut off bias, the collectors of transistors 12Q through 17Q is also reduced by having any of those transistors in conduction corresponding transistors of the group 20Q through 25Q are placed in conduction to issue their respective signals.

These alternative sources of bias are from positive sources, e.g. +24 volts d.c. of the computer, at terminals 114 through 119, through resistors 120 to 125 to the emitter-collector circuits of 12Q to 17Q and computer ground so that conduction in the respective transistors results in a drop at the respective anodes to isolating rectifiers 126 to 131 and thus at the respective bases of 20Q through 25Q.

With the voltage at the junction between the isolating rectifiers reduced to of the order of 6 volts, the base bias on the corresponding transistors 20Q through 25Q is reduced to permit their conduction. For example, where negative pulses are present on lead 50 to signify a "run" setting and to place 12Q in conduction, during the ECO interval, the junction 132 between rectifiers 126 and 108 is about +6 volts. This drops the positive bias at terminal 133, e.g. +24 volts d.c. from the computer at the base of 20Q by the current flow in resistor 134 through rectifier 135 and resistor 136 to computer ground. Transistor 20Q therefore conducts.

The digital inputs to the computer when no effective signal is presented have a negative bias at the terminals 98 through 104. When an effective signal is present at the terminal, the voltage is less negative; for example with −15 volt d.c. computer supplied bias at terminals corresponding to terminal 137 and terminals corresponding to terminal 138, when the transistor 20Q is non-conductive the full negative bias appears at digital input terminal 98. When transistor 20Q conducts, the bias from 138 is dropped across resistor 139 and the bias from 137 is dropped through resistor 140 in conjunction with resistor 141 through rectifier 142. In the example the resistance of resistor 140 is about 5 times resistor 141 hence the voltage at 98 is reduced to about −2 volts when 20Q is conductive. This is effective within the computer to indicate a "run" condition at the work station under consideration.

In a similar manner a train of positive pulses in lead 50 indicating a "down" setting for the work station causes transistor 13Q to conduct so that during the application of the ECO ground signal at 99, transistor 21Q will conduct to raise the potential at digital input terminal 100 to the computer. The binary code of the message transmitter decks 39 and 40 also apply effective signals at respective digital input terminals 101 for "1", 102 for "2", 103 for for "4" and 104 for "8" whereby the computer receives status information in response to each ECO ground signal to that work station monitor.

Count information is passed to the central station on lead 66 as a train of positive pulses during the interval contact 65 is closed. Counts are effective on a mechanical counter or recorder (not shown) as at terminal 143 by causing transistor 4Q to transfer from cut off to saturation in response to a shift of its base bias applied through rectifiers 144 and the filtering afforded by resistors 145, 146, 147 and 148, and capacitance 149. The computer is supplied count information through arrow-headed leads 150 of FIGS. 4 and 5 to an interface as described above including an isolation transformer 151 having its secondary and secondary shield 90 grounded to the computer ground and its primary connected to the plant and monitoring system ground. A train of positive pulses of a duration characteristic of a true count signal as distinct from spurious signals places transistor 19Q in conduction to partially enable transistor 26Q for conduction. Transistor 26Q conducts only on coincidence of a count signal from 19Q and application by the computer of a ground to terminal 152 of the computer's electronic contact operate (ECO) for the "count". The count ECO is effective when the machine count is to be scanned. When 26Q conducts, it issues a count signal at the "count" digital input (DI) terminal 153 for the computer as described for status digital inputs.

Discrimination of count signals from spurious signals is provided by the time delay of capacitance 154 and resistance 155 in the base circuit of 19Q arranged to pass pulses of less than about 200 milliseconds duration to ground. Transistor 18Q is ordinarily biased to cut off. Longer pulses raise the potential of the collector of transistor 18Q to a level permitting it to enter a saturated conduction state and locks transistor 19Q in conduction while the count signal persists and beyond for an interval determined by the delay of the network of capacitance 154 and resistance 155.

The sensing circuits are not shown. They correspond to the count circuit except for the actuating means for the contact to which they respond. Thus, they have a recording output corresponding to terminal 143 and input corresponding to contact 65. They have an isolating transformer with a shielded secondary and with computer ground on the circuits on the secondary side and plant ground on the primary side. Each sensing circuit has a time delay with a transistor corresponding to 18Q, a control transistor corresponding to 19Q, a coincidence gate corresponding to transistor 26Q and its associated circuits with a digital input to the computer corresponding to terminal 153. Each condition in the work station "sense" group is gated to its computer digital input by a common "sense" electronic contact operate from the computer corresponding to terminal 152.

In the preceding discussion, the information for a typical work station has been shown to be passed to a monitoring computer in response to electronic contact operate (ECO) signals for "status", "count", and "sense". In some instances the scanning rate of the ECO is too low to provide valid indications of the factor to be monitored. For example, in one instance 68 ECOs have been utilized with 48 digital inputs and have been cycled so that they scan the plant equipment to be monitored in 11 seconds. If factors to be monitored occur within a period of less than 11 seconds, such operations can occur between scans without being indicated to the computer. Under these circumstances the high speed operation can be continuously indicated to the computer by applying continuous computer ground to the computer ECO input terminal of its interface circuit without further modification of the circuit typified by the count monitoring circuit.

The plant is monitored in groups of work stations as dictated by the number of digital inputs available. Where six "status" inputs are required for each work station, the 48 digital inputs are utilized to read "status" for eight work stations simultaneously by activating the "status" ECO for those work stations. The second ECO operation can activate status for another group of eight work stations and so forth until the "status" of all stations has been read. The count can next be read. Since only one digital input per work station is required for count, 48 stations can be read for count in a single ECO operation. Conditions at the work station can next be sensed. For example, certain stations may have only four digital inputs for "sense", hence 12 stations can be read as a single ECO operation. The above examples are merely illustrative of the reading sequences which can be established, the limiting factor being the number of digital inputs for a given read interval and the combination of outputs from the monitoring system which can be accommodated by those inputs.

The mechanisms controlling the visual display of signals will now be considered in further detail. As shown in FIG. 1, the face of the control box 11 displays a run lamp 12, which can be color coded green, a down lamp 13, which can be coded red, a key operated switch 14 for assigning the station to a run, down or off status at the floor and a message transmitter switch 15. FIG. 2 shows a console 23 for a central station at which a number of work stations are visually monitored. The console includes an array of ground glass screens 18 upon which are displayed in horizontal alignment a green or run lamp indicator 16, a red or down lamp indicator 17 and a work station identification 19, as an illuminated number, for each of four work stations. In horizontal alignment with the indicator displays is a "display-reset" button 33 for the work station controlling switch blades 156 and 157 as shown in FIG. 4. The blades 156 and 157 are biased to the position illustrated. When shifted to contacts 158 and 159 the polarized binary code output of leads 43 and 44 is connected to arrow-headed leads 160 and 161 extending to a polarized matrix, FIG. 6, for decoding the binary code to a group of projection lamps 163 corresponding to the designations "1" through "11" of switch 15. These projection lamps are arrayed with a marking means and projection lense (not shown) which causes messages corresponding to those displayed on the work station control panel to be displayed on a ground glass screen on the console. Four message screens are illustrated in FIG. 2 at 28, 29, 31 and 32 so that four sets of messages can be set up for the various work stations. For example, in a tire manufacturing plant work station number 1 might have the messages for switch 15 on control box panel 11 and might display those messages on screen 28 coded as:

1 Mechanic
2 Electrician
3 Mold Change
4 Plate Change
5 Bladder Change
6 Mold Clean
7 Automatic Control
8 No Tires
9 No Schedule
10 Defective Tires
11 Supervisor Another work station at which tires are built might have its messages for switch 15 on control box panel 11 and might display those messages on screen 29 coded as:

1 Mechanic
2 Electrician
3 Treads
4 First Ply
5 Second Ply
6 Third Ply
7 Fourth Ply
8 Side Wall Bead Chafer
9 Off Standard
10 Schedule Change
11 Supervisor The attendant monitoring the central station console views an array of windows 18 some of which have green lights in the left-hand vertical column indicating work stations in the "run" status, others of which have red lights in the central column indicating "down" status stations and others of which are dark across the horizontal alignment of indicators to signify that the station is in "off" status. In response to a trouble call on switch 14 at a work station, a light is blinked to attract the console operators attention. If the station is in "run" status, the green light blinks alternately with the red light for that station. When the station is "down", or "off" only the red light blinks for a trouble message. When the console operator presses the "display-reset" button for the work station having an unacknowledged trouble message while the button is depressed, the work station is identified by the display of its symbol at 19 on window 18 of FIG. 3, and the message is displayed for the work station as on screen 28 according to the setting of switch 15. Upon depression of the "display-reset" button 33 for a station in "run" status, the blink of the red lamp terminates while the blinking green lamp continues. For a "down" station, the depression of the button 33 transfers the red lamp to a continuous illumination, for an "off" station, the button darkens the display on 18. If a second message is set on switch 15, the reset is negated at the console and the blink pattern reestablished until the "display reset" button for the station is again depressed.

When a trouble call is set on switch 15 of a work station, the console "down" lamp 17 for that work station blinks. If the station is not set for "down" status, the transistor 1Q receives a positive going base signal from transistor 8Q. When transistor 2Q is conductive it causes darkening of the lamp 17, by grounding the positive base signal from 8Q. If the station is set for "down" status, the transistor 1Q is conductive in response to positive half wave signals from lead 50 until the transistor 2Q is placed in conduction and effectively grounds the base of 1Q. A blinking signal in the form of a positive 10 volt square wave which can be derived from a square wave generator (not shown) is applied to terminal 164 and, when a trouble message is set on switch 15, controls transistor 6Q so that the transistor is conductive during the positive square wave pulses and is cut off in the intervals between those pulses. Transistor 6Q in conjunction with transistor 8Q, which is conductive when a trouble message is set, places transistor 2Q in conduction when 8Q is in conduction and 6Q is cut off, and cuts off transistor 2Q, when both 8Q and 6Q are in conduction. Thus, the down lamp 17 is lighted when the positive blink pulse is imposed and is darkened when it is absent.

A trouble call on switch 15 of a work station affects operation of the "run" lamp 16 at the console for that work station only when the station is in "run" status. It causes the "run" lamp to blink alternately with "down" lamp 17 since the imposed positive blink pulse at 164 lights the lamp 17 and absence of the pulse darkens the lamp.

At the control box for the work station, the down lamp 13 blinks when a trouble message is set on switch 15 since transistor 5Q is a driver for that lamp. Transistor 5Q is switched to conduction with 2Q by a coincidence of conduction in 8Q and cut off in 6Q.

Response of an operator at the console by operation of "display-reset" switch 33 causes the work station identification to be displayed on the console indicator window 18 and the trouble message to be projected on one of screens 26 to 32 while the actuating button 33 is depressed. As the button 33 is depressed, the blinking of the "down" lamp is terminated and the "run" lamp continues to blink for a station in "run" status thereby providing the operator with a reminder that a trouble message has been acknowledged and remains set at the station. The "down" lamp is extinguished by momentarily making transistor 3Q conductive to fire controlled rectifier 1SCR thereby disabling transistor 2Q by grounding the signal to its base. A resetting of trouble message switch 15 to a new message momentarily cuts off transistors 10Q and 8Q thereby terminating conduction in 1SCR and resetting the "down" lamp controls so that a new message causes blinking until acknowledged by depressing the "display-reset" button 33.

When a trouble message is set by shifting switch 15 from the "0" setting, a half wave positive a.c. signal is passed on lead 64 through resistor 165 to the base of transistor 10Q. Initially, 10Q is biased to cut off by the negative 10 volt d.c. imposed at terminal 166 through resistor 167 to the base of 10Q. The positive signals switch 10Q to saturation, thereby reducing the base bias on transistor 8Q by the drop in resistor 168. A positive emitter bias of plus 10 volts d.c. holds 8Q cut off until 10Q is conductive. The drop in grounded resistor 169 when collector current flows effectively raises the base potential of transistor 7Q to transfer 7Q for a cut off state to a state of saturation. With 7Q switched on, transistors 6Q and 11Q are rendered responsive to the positive pulses of the blink signal at terminal 164.

When the work station is in the "run" status, transistor 11Q is switched to saturation by the negative pulses on lead 50 to drive the base of 11Q negative. The base of 11Q is prevented from going negative to saturation when transistor 9Q is on by the drop in resistors 74 and 170. Transistor 9Q is on when 7Q is conductive and a positive blink signal is present at terminal 164, since the emitter-base bias of 9Q is at the saturation level. Conversely, when the positive blink signal is removed, the emitter-base bias diminishes to cut off and transistor 11Q is permitted to conduct by the negative half wave signal on lead 50 and lights lamp 16.

The circuits controlling "down" lamp 17 are dependent upon conduction in transistor 1Q in response to the positive half wave signal on lead 50 switching 1Q from cut off to saturation when applied to its base through rectifier 70 and resistor 71. This switching is prevented when he work station is set for "down" status by the grounding of the base of 1Q and thus the signal from 50 when transistor 2Q is conductive. Transistor 2Q has its base bias driven positive to conduction when transistor 8Q is placed in conduction by a trouble message to impose a signal from the collector of 8Q through resistor 171, rectifier 172, resistor 173 and rectifier 174. The positive blink signal returns 2Q to a cut off condition, thereby causing 1Q to conduct and light lamp 17, by instituting conduction in transistor 6Q as its base is carried positive relative to its emitter by the blink pulse in resistor 175. With 6Q conductive, it reduces the base potential of 2Q by the drop of 8Q collector current in 171 and 173.

Lamp 17 is caused to blink for a trouble signal when the work station is in "run" or "off" status by control of transistor 1Q by transistor 2Q. With no positive half wave signal from lead 50 to place 1Q in conduction, a positive base bias is provided by transistor 8Q, when conductive, through the collector of 8Q, resistor 171, rectifier 172, resistor 176 and rectifier 177. As described above, when the positive blink signal places 6Q in conduction, it raises the base of 2Q to conduction, and grounds the base of 1Q whereby the light 17 is darkened.

Transistor 5Q, when conductive, supplies lighting current to work station "down" lamp 13. A 24 volt a.c. supply is connected to the emitter of 5Q through rectifier 178. When 8Q is conductive, it biases the base of 5Q to conduction through the collector of 8Q, resistor 171, rectifier 172, resistor 173, rectifier 179, and resistor 180 unless transistor Q6 is conductive to effectively ground that signal through lead 181, 6Q and 7Q. Thus, as described, when a positive blink signal is present in coincidence with a trouble signal transistor 5Q is cut off and supplies no current to lamp 13. When a trouble signal is imposed and the positive blink signal is absent, 6Q is non-conductive and 8Q is conductive to place 5Q in conduction and light lamp 13 through lead 182 and rectifier 183.

Depression of the "display-reset" button 33 on the console adjacent lamps 16 and 17 when a trouble message is indicated by their blinking, terminates the trouble message indication by terminating the blinking of the "down" lamp 17 and the lamp 13 at the control box 11. This is accomplished by maintaining transistors 2Q and 5Q cut off so they have no control of the lamps. A continuous ground is imposed on the base of transistors 2Q and 5Q and the energizing signal from 8Q to the base of 1Q is also grounded by gating a controlled rectifier 1SCR having its anode connected to the circuit supplied by the collector of 8Q and its cathode grounded. Gating of 1SCR is by conduction of transistor 3Q. 3Q is ordinarily biased to cut off with the emitter at or near ground. When blade 156 of the "display-reset" switch is separated from contact 184, the positive 10 volt d.c. signal at terminal 185 is applied through resistor 166 to the emitter of 3Q and causes it to conduct thereby developing a potential across 187 which is applied to the gate through resistor 188 and rectifier 189. Conduction is sustained by the gating of the residual charge on capacitor 190 between half wave a.c. pulses from the collector of 8Q. However if a relatively long interruption is experienced, as where switch 15 is moved and the contact arms 63 are all separated from the stationary contacts of deck 47 as they pass from one position to the next, then the anode supply to 1SCR is interrupted for a sufficient interval to permit the charge on capacitor 190 to decay to a level where gating is no longer supplied and 1SCR stops conduction. If a new message is set, so that positive half cycles are applied to lead 64 and transistor 10Q from deck 47 of switch 15 the blinking sequence of the status lamps is repeated. If the repositioning of switch 15 is to its zero position, no signal is applied to lead 64 and only the "run", "down" or "off" indication is effective.

Two circuits are responsive to the call setting of switch 15. One provides a signal to the output to the computer at digital inputs (DI) 101 for a "1", 102 for a "2", 103 for a "4" and 104 for an "8" by negative half wave pulses on lead 43 for a "1" and positive pulses for a "2", and by negative half wave pulses on lead 44 for a "4" and positive pulses for an "8". These signals are passed from FIG. 4 to the computer interface of FIG. 5 through resistor 191 to arrow-headed lead 192 and resistor 193 to arrow-headed lead 194. In FIG. 5 the polarization of the signals enables them to be segregated by rectifiers so that rectifier 195 passes negative pulse of a binary "1" signal to transformer 196 on the circuit to DI "1" terminal 101. In this instance, the windings are reversed to provide a positive going signal to the base of 14Q. A binary "2" positive going signal from 192 is passed by rectifier 197 to transformer 198 having like poled primary and secondary windings. Binary "4" and "8" signals on lead 194 are passed by rectifiers 198 and 199 to respective isolating transformers polarized to produce DI outputs "4" and "8" at 103 and 104 respectively.

The alternative circuit for the call signals is through contacts 156 and 157 controlled by read-reset button 33 for the work station to a decoding matrix common to a plurality of work stations from which like messages can be transmitted. In the example of a system having four display screens 28, 29, 31 and 32 four such decoding matrices are provided. Arrow-headed leads 160 and 161 for binary "1" and "2" and binary "4" and "8" respectively extend from the switch 33 on FIG. 4 to FIG. 6.

Message display projection lamps 163 are supplied from the switch 33 on FIG. 4 to FIG. 16

Message display projection lamps 163 are supplied from a suitable a.c. source connected to lead 201 at terminal 202. Each lamp is switched on by completion of a circuit to ground by means of a controlled rectifier. The control circuit for the controlled rectifiers are of the same general form and therefore but one circuit, that enclosed by dashed line 203, is shown and all others are represented by rectangles 204 embracing like circuits which differ only in their external connections. In order to correlate the circuits, the terminals of each will be designated A, B, C and D in counterclockwise order beginning at the top.

The coupling and decoding circuits are similar to those employed for the output circuits to the computer as shown in FIG. 5 except that no isolated ground or floating power supplies are required and the monitoring system ground and power supplies are employed on both sides of the transformers. Filtering of the signal on lead 160 is by resistor 204 and capacitor 205 to ground while diodes 206 and 207 to suitable positive and negative d.c. supplies provide a clamp.

Negative half cycles of a binary "1" are passed by rectifier 208 to the primary of transformer 209 to produce by the polarity inversion in the transformer a positive signal on the base of transistor 27Q. Transistor 27Q is normally biased to cut off by the positive signal applied at terminal 210 through resistor 211 to its collector. Thus, in the absence of a binary signal, the transistor for that signal remains cut off and its collector potential is at a positive level, essentially 24 volts in the example.

Binary number signals are issued from transistors 27Q, 28Q, 29Q and 30Q at their collectors on leads 212, 213, 214 and 215 as "1", "2", "4" and "8", respectively. These signals are applied to the C and/or D terminals of the SCR control circuits in combinations to produce the decimal decoding as indicated adjacent the projection lamps. When any signal connected to these inputs is positive the base of transistor 31Q or its equivalent is positive and the transistor is cut off. Upon the removal of all positive signals on inputs C and D the base of transistor 31Q or its equivalent is effectively grounded to impose the drop in resistor 216 between the positive 10 volt emitter bias at 217 and the negative 10 volt collector bias at 218 on its collector as an effective positive signal. This positive collector signal provides a gating signal to 2SCR through resistor 219 so that the associated projection lamp 163 is switched on.

In the binary to decimal decoding cross inhibiting is provided from each decimal number to each of its component decimal numbers. Thus the illustrative control is for the number "9" made up of an "8" and a "1" from the grounding of leads 215 to input 203D and 212 to input 203C to the base of 31Q. It will be noted that the corresponding controls 220 for the number "8" and 221 for the number "1" respectively receive gating signals from grounded lead 215 to 220C and 212 to 221C. These signals are negated by the inhibit signal from the collector of the active number control, "9" in the example, as from 203A to 220D and from 203B to 221D whereby the controls for number "8" and number "1" remain "off" while the control for "9" is effective. Blocking diodes 222 and 223 in the number "8" inhibit lead 224 and number "1" inhibit lead 225 prevent an 2SCR gating sneak circuit from other inhibiting signals.

All odd number controls offer inhibit outputs to the control for "1", 221. Thus lead 225 receives a positive inhibit signal when any of controls 226 for "5", 227 for "7", or 228 for "3" are active to issue a signal from their B output terminal. In like manner inhibit leads 229 and 230 are provided to the control circuits 231 and 232 for numbers "2" and "4" from those other controls for numbers having "2" or "4" as a component. These inhibits are supplied through blocking diodes from A and B terminals of the control circuits for those numbers.

The D terminal when coupled to a binary digit circuit has a blocking diode poled to pass positive signals from the binary digit circuit to the terminal as by rectifier 233 in lead 215 to terminal 203. One input from the binary digit circuits to the decimal control circuits requires no blocking diode since the remaining diodes prevent sneak circuits, thus, the C terminal of each decimal control circuit has no diode.

One deviation from a true binary to decimal code has been introduced in the interest of economy. Decimal "11" in fact is a coded and decoded decimal "12" by virtue of the combination of binary "4" and binary "8".

Figure 6:
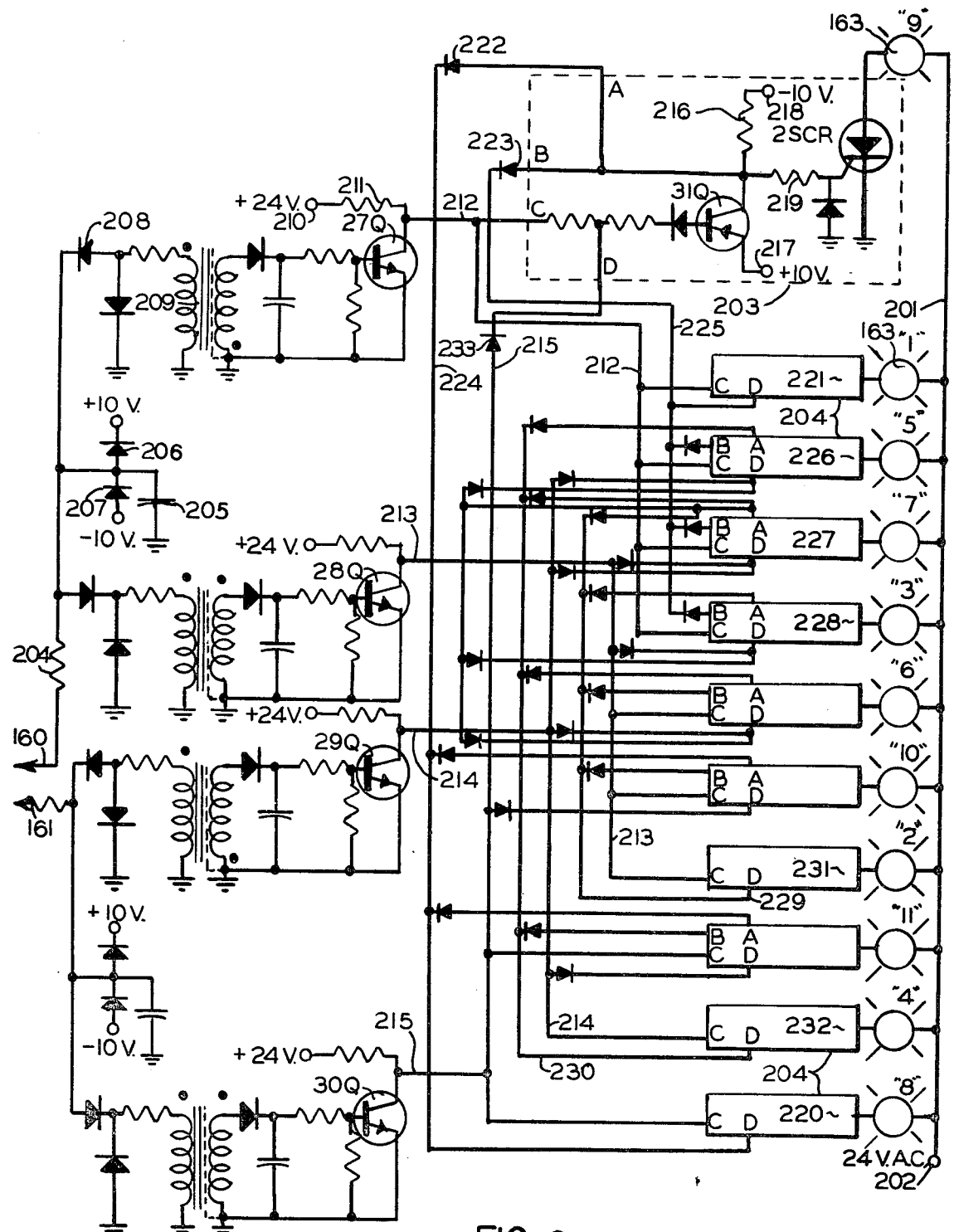
FIG. 6 is a schematic diagram of the display control for the central station adapted to be selectively coupled to the work station controls of FIG. 4 through operation of a switch.

Plant noise has been of a level to produce false signals in the projection lamp controls of FIG. 6. Accordingly, the interface from the leads 160 and 161 to the lamp controls includes a filter typified by the capacitance to ground 205 and the resistor 204 and the clipping circuit of back biased diodes 206 and 207 limiting the signal to the primary of the coupling transformer such as 209 to 10 volts positive or negative, as the case may be. Also, as in the case of the computer interface circuits, the binary number signal sources to the matrix are converted from the polarized half wave signals to like polarity signals by the polarization of the coupling transformers, and the signals from their secondaries are smoothed by a resistance-capacitance combination in the emitter-base circuit of the transistor signal sources.

The system disclosed lends itself to numerous modifications without departing from its spirit or scope. For example, the means of control of work station status for each work station can be located at the central station, different combinations of operation of status signals can be employed as characteristic of a trouble message transmission or "read-reset", and audible signals can be substituted for the status signals to indicate transmission of a trouble message. Accordingly, it is to be understood that the present disclosure is to be read as illustrative and not in a restrictive sense.

We claim:

1. A production monitoring system including a plurality of work stations; means at each work station for sensing a production parameter and generating a signal in response thereto; means at each work station selectively operable by an attendant at said station to generate a selected one of a plurality of distinct signals; a central station; means connecting said sensing means and said selectively operable generating means at each work station with said central station; a computer coupled to said central station to respond to said production signal means and said selected signal means; display means at said central station, common to a plurality of said work stations to issue an intelligible signal corresponding to said work station attendant selected signal of said plurality of distinct signals from a selected one of said work stations to an attendant at said central station; means at said central station, individual to each work station to alert an attendant at said central station to the generation of a work station attendant selected signal at said work station; and means at said central station, individual to each of said work stations to enable an attendant at said central station to actuate said signal display means for any one of a plurality of work stations for issuing a work station attendant selected signal generated by said generating means at said respective work station.

2. A system according to claim 1 wherein at least two of said work stations have selectively operable signal generating means which produce a different set of distinct signals and at least two of said work stations have selectively operable signal generating means which produce a like set of distinct signals; said system including at least two means to display issue intelligible signals at said central station wherein one of said signal issuing means is for work stations having generating means for one set of distinct signals and another of said signal issuing means is for work stations having generating means for another set of distinct signals.

3. A system according to claim 1 including means to alter the operating mode of said alerting means for a work station in response to operation of said actuating means for said work station.

4. A system according to claim 3 including means to institute operation of said alerting means in its original operating mode in response to the selective operation of said signal generating means to a new signal without first terminating signal generation from said signal generating means.

5. A system according to claim 1 including work station status indicators for each work station, and means to alter the mode of operation of said status indicators for a work station in response to the selective operation of a signal generator at said work station.

6. A production monitoring system including a work station; means at said work station for sensing a production parameter and generating a signal in response thereto; means at said work station selectively operable by an attendant at said station to generate a selected one of a plurality of distinct signals; a central station; means connecting said sensing means and said selectively operable generating means at said work station with said central station; a computer coupled to said central station to respond to said production signal means and said selectively operable signal means; generating means to issue an intelligible signal corresponding to said work station attendant selected signal from said work station to an attendant at said central station; a first ground common to said work station signal generating means, to said connecting means, and to said signal issuing means; a first power supply for said elements having said first ground; a second ground for said computer independent of said first ground; a second power supply connected to said second ground and independent of said first power supply and said first ground; a transformer having a primary connected to a signal generating means and said first ground; a secondary for said transformer statically shielded with respect to said first ground and connected to said second ground, said second power supply and said computer; and a signal clipping means and a high pass filter to said first ground in circuit with said signal generating means and said transformer primary whereby spurious signals of high frequency or high voltage tend to be excluded from said primary.

7. A system according to claim 6 including a smoothing capacitance across the secondary of said transformer.

8. A system according to claim 6 including a first transistor having its base connected to the secondary of said transformer at a point remote from said second ground; an emitter of said first transistor connected to said second ground; a second transistor; a first source of cut off bias for said second transistor base connected to the collector of said first transistor; a computer input circuit connected to the collector of said second transmitter; and means to apply selectively a second source of cut off bias for said second transistor base whereby conduction in said first transistor reduces the signal from said first source of cut off bias and causes said input to issue a computer input signal when the signal is reduced from said second source of cut off bias.

9. A system according to claim 6 including polarizing means for said signal generator to generate selected polarized signals, said connecting means transmitting signals of both polarities; means to segregate said signals as to polarity; a plurality of transformers; a primary for each transformer connected between said segregating means and said first ground whereby signals of a first polarity are applied to a first group of said primaries and signals of the second polarity are applied to a second group of said primaries; and a secondary for each transformer connected to issue a signal of a given polarity with respect to said second ground to said computer for all transformers, each of said secondaries being shielded with respect to said first ground.

10. A production monitoring system comprising a plurality of work stations; a signal generating means for each work station; means responsive to a predetermined condition at each work station to actuate said generating means for said station; an output to a computer for a signal for each work station generating means; a first solid state active element directly coupled to each output; a first transformer directly coupling said signal generating means and said solid state active element; a first primary for said transformer; a first ground for said signal generating means and said primary; a secondary for said transformer; a second ground independent of said first ground for said computer, said solid state active elements, and said secondary; a shield for said secondary coupled to said second ground to isolate said secondary from said first ground; and signal clipping means and a high pass filter to said first ground in circuit with said signal generating means and said transformer primary whereby spurious signals of high frequency or high voltage tend to be excluded from said primary.

11. A combination according to claim 10 including signal polarizing means for said signal generating means, a second solid state active element, a second transformer directly coupling said signal generating means and said second solid state active elements; a first unidirectional conductive device admitting a first polarity signal to said primary of said first transformer; a second unidirectional conductive device poled opposite said first device for admitting a second polarity signal to a primary of said second transformer; and the secondaries of said first and second transformers being connected to issue signals of like polarity in response to the admission of respective signals to their primaries.

12. A production monitoring system for a plant comprising a work station, a central station, means for indicating production status at said work station, a transmission line between said work station and said central station, means for selectively transmitting polarized electrical signals on said transmission line from said work station, solid state switching means for decoding said signals, a visual display characteristic of selected signals at said central station and responsive to said switching means, a plurality of outputs for said selected signals adapted to be connected to a computer, an interface circuit including a clamp, a polarizing diode, a transformer primary coupled to plant ground, a transformer secondary coupled to computer ground and polarized to produce a positive going signal in response to an effective input signal, a first transistor switch responsive to said positive going signal and referenced to computer ground, a second transistor switch responsive to a computer address signal and referenced to computer ground and a transistor coincidence gate referenced to computer ground and passing a signal to an output adapted to be connected to said computer.

* * * * *